US008195835B2

(12) United States Patent
Ansari et al.

(10) Patent No.: US 8,195,835 B2
(45) Date of Patent: Jun. 5, 2012

(54) ENDPOINT ADDRESS CHANGE IN A PACKET NETWORK

(75) Inventors: Furquan A. Ansari, Middletown, NJ (US); Ajay Sathyanath, Woodbridge, NJ (US)

(73) Assignee: Alcatel Lucent, Paris (FR)

( * ) Notice: Subject to any disclaimer, the term of this patent is extended or adjusted under 35 U.S.C. 154(b) by 2001 days.

(21) Appl. No.: 10/766,164

(22) Filed: Jan. 28, 2004

(65) Prior Publication Data

US 2005/0198384 A1    Sep. 8, 2005

(51) Int. Cl.
G06F 15/16 (2006.01)
G06F 15/173 (2006.01)
(52) U.S. Cl. .................. 709/245; 709/225; 709/238
(58) Field of Classification Search .......... 709/224–226, 709/238–245
See application file for complete search history.

(56) References Cited

U.S. PATENT DOCUMENTS

| | | | | |
|---|---|---|---|---|
| 6,018,659 | A * | 1/2000 | Ayyagari et al. | 455/431 |
| 6,072,942 | A * | 6/2000 | Stockwell et al. | 709/206 |
| 6,332,163 | B1 * | 12/2001 | Bowman-Amuah | 709/231 |
| 6,721,907 | B2 * | 4/2004 | Earl | 714/57 |
| 6,781,963 | B2 * | 8/2004 | Crockett et al. | 370/260 |
| 2002/0141365 | A1 * | 10/2002 | Leung | 370/335 |
| 2004/0151158 | A1 * | 8/2004 | Gannage et al. | 370/351 |
| 2004/0202160 | A1 * | 10/2004 | Westphal | 370/389 |

FOREIGN PATENT DOCUMENTS

JP            10308775 A    11/1998

OTHER PUBLICATIONS

Funato et al, TCP-R: TCP Mobility Support for Continuous Operation, Aug. 16, 2007, 1997 IEEE.*
"TCP-R: TCP Mobility Support for Continuous Operation," by Daichi Funato, et al, 1997 IEEE, 0-8186-8061-X97; pp. 229-236.
"Mobile Communication with Virtual Network Address Translation," by Gong Su and Jason Nieh, Technical Report CUCS-003-02; XP-002286437, pp. 1-14.
"Mobile IP," by Charles E. Perkins, IEEE Communications Magazine, May 1997, pp. 84-99.
"Reliable Network Connections," by Victor C. Zandy Barton P. Miller, MOBICOM'02, Sep. 23-28, 2002, pp. 95-106.
"Tutorial guide to Unix sockets for network communications," by David Coffield and Doug Shepherd, Networks, vol. 10, No. 1, Feb. 1987, pp. 21-29.
Funato, Daichi, et al., "TCP-R: TCP Mobility Support for Continuous Operation," IEEE Network Protocols, 1997, pp. 229-236.
Notice of Preliminary Rejection received in Korean Patent Application No. 10-2005-0005793, Mailing Date: Mar. 27, 2011 (7 pages).

* cited by examiner

Primary Examiner — Yasin Barqadle
(74) Attorney, Agent, or Firm — Mendelsohn, Drucker & Associates, P.C.; Kevin M. Drucker; Steve Mendelsohn

(57) ABSTRACT

A seamless transport endpoint mobility (STEM) architecture migrates a transport connection endpoint from an old IP address to a new IP address without loss of the session. The migration process is negotiated between two endpoints themselves. Transport endpoint mobility includes communication between two STEM daemons, one STEM daemon in each endpoint, which dynamically updates kernel data structures (e.g., elements of a 5-tuple associated with a TCP/IP application) associated with the session. Migration is transparent to the application using the underlying transport connection for data transfer.

21 Claims, 5 Drawing Sheets

FIG. 5

| VERSION | TYPE | SEQUENCE # |
|---|---|---|
| FLAGS/CODE | | IDENTIFIER COOKIE... |
| ... IDENTIFIER COOKIE (CONT.) | | |
| REPLAY PROTECTION ID... | | |
| ...REPLAY PROTECTION ID (CONT.) | | |

| TYPE | LENGTH | SPI ... |
|---|---|---|
| ... SPI (CONT.) | | AUTHENTICATION... |
| ...AUTHENTICATION (CONT.) ... | | |

FIG. 7

| TYPE | LENGTH | PROTOCOL ID FLAGS |
|---|---|---|
| OLD IP ADDRESS | | |
| NEW IP ADDRESS | | |
| OLD PORT | | NEW PORT |
| OLD PORT | | NEW PORT |
| ... | | |

FIG. 8

| TYPE | LENGTH | SUB-TYPE | FLAGS/CODES |
|---|---|---|---|
| OPAQUE DATA ... | | | |

ENDPOINT ADDRESS CHANGE IN A PACKET NETWORK

BACKGROUND OF THE INVENTION

1. Field of the Invention

The present invention relates to migrating transport connections in a communications network, and, more particularly, to migration of existing sessions across addresses in a packet network.

2. Description of the Related Art

With growth and proliferation of mobile and wireless computing devices (mobile devices) that access the Internet, an infrastructure to support seamless roaming across internet protocol (IP) subnetworks (subnets) is required. Many users employ a dynamic host configuration protocol (DHCP) to obtain an IP address for connectivity, but employing DHCP only provides portability and does not provide relative transparency for seamless roaming. Every move across an IP subnet by a mobile device requires first releasing the old IP address and then acquiring a new IP address, which results in the loss of transport (and higher-layer) connections.

Normal network communication between two entities includes specifying a unique endpoint identifier, such as an IP address, that does not change during the communication period. For example, a typical transmission control protocol (TCP) connection establishment procedure between two endpoints (e.g., hosts) begins with the applications using a socket application programming interface (API) packet. Each socket API is explicitly bound to a given 5-tuple comprising the following five elements. The first element is the "Protocol" element identifying the particular communication protocol for the packet. The second element is the "Source IP address" element identifying the IP address of the source node originating the packet. The third element is the "Source Transport Port" element indicating the port of the source node originating the packet. The fourth element is the "Destination IP Address" element identifying the IP address of the destination node to receive the packet. The fifth element is the "Destination Transport Port" element indicating the port of the destination node receiving the packet. Any changes to any of these 5-tuple elements during a session will cause a session failure and typically initiates connection re-establishment.

Given the 5-tuple structure, the following outlines establishment and maintenance of a connection in current TCP-compliant packet networks. A TCP engine's connection establishment procedure involves a sequence of message exchanges between a client (first endpoint) and a server (second endpoint). The client begins by sending a SYN message to the server, and the client receives a SYN-ACK message from the server in response. The client responds back to the server with an ACK message in acknowledgment, and the connection between the client and the server is then open and fully functional. The TCP engine on both ends of the connection goes into the ESTABLISHED state with the state information being maintained in the TCP Control Block (TCB) within the operating system kernel. The TCP session is now uniquely identifiable in the network by the 5-tuple contained in the IP datagrams (packet header portions) traversing the network. From the application's and the operating system kernel's perspective, this session can be uniquely identified by the socket associated with this session. Any change to even one of the elements of the 5-tuple leads to session failure.

A TCP session failure occurs when TCP aborts the connection and closes the associated socket bindings. There are many reasons for the TCP to abort a connection, some of which include: 1) receiving a TCP RST (reset) packet from the remote end; 2) exceeding the number of retransmission attempts defined by the protocol; 3) too many unacknowledged "Keep-Alive" probes; 4) a request by the application; and 5) an abnormal external condition. These TCP reset conditions routinely occur in normal operation of a packet network, and may arise from changes to the interface IP address, extended periods of connectivity loss, host crashes/reboots, or similar contributions to TCP connection failure.

Since the application using the TCP transport session is bound to the socket with the original 5-tuple (with the old IP address), changing the IP address of the interface doesn't change the associated application socket binding. Any user data sent by the application to the kernel gets queued at the TCP layer as transport layer segments in TCP's send-queue (send-Q) because there is no valid output interface with the old IP address to send out the data on. TCP's retransmit mechanism keeps retrying to send this data out until a valid route/interface appears or the connection times itself out. If there is no reachability between the two end systems, the TCP state on either side continues to be (normally) in its previous state (e.g., both sides continue to be in ESTABLISHED state). If the IP address of the interface reverts back to its original address (thereby, the original 5-tuple), communication between the endpoint applications resumes, provided a route exists. However, if the IP address of the interface changes, any data packets received from the remote host get dropped at the IP layer since there is no valid interface to associate the data with. Both the local end and the far end time-out their respective connections depending on their TCP state.

This session establishment and maintenance process is restrictive and imposes limits on certain types of applications, such as user mobility or fault tolerant connections. Mobile IP of the prior art was developed to achieve host mobility by bypassing this restriction using routing techniques at the network layer. According to Mobile IP, for a node to change its point of attachment without losing its ability to communicate, currently one of the two following mechanisms must typically be employed: either 1) the node must change its IP address whenever it changes its point of attachment or 2) host-specific routes must be propagated throughout much of the Internet routing fabric. Both of these alternatives are often unacceptable. The first mechanism makes it impossible for a node to maintain transport and higher-layer connections when the node changes location. The second mechanism exhibits severe scaling problems, especially relevant considering the explosive growth in sales of notebook (mobile) computers.

Many techniques exist in the prior art that have been proposed to reduce host mobility and fault resiliency problems. These techniques can be classified into those providing a solution at the network layer (e.g., IP layer), the transport layer (e.g., TCP/UDP (User Datagram Protocol), or higher layers (e.g., the socket or application layer).

Mobile IP attempts to solve host mobility problems at the network layer by using a level of routing indirection or triangular routing of all packets from a correspondent host to a mobile node. This routing indirection is accomplished through the use of "Home Agents" and "Foreign Agents" that are proxies providing services to the mobile node. Although Mobile IP handles host mobility and reachability problems well, it does not handle transport connection failures (e.g., any changes to the transport endpoints leads to a session failure). Typically, applications depending on transport session connectivity need to be restarted and a new transport connection has to be established. Other disadvantages of Mobile IP include non-optimized triangular routing and extensive use of IP tunneling. Due to security reasons, service providers typically disallow tunneled packets. Further, due to the increased frequency of Denial-Of-Service (DOS) attacks, service providers use ingress filtering to block packets that spoof source addresses. Although the ingress filtering problem might be solved by using reverse tunneling, reverse tunneling leads to further sub-optimal use of networking resources and adds extra packet delays between the two endpoints.

Methods that attempt to solve the problem of end-to-end host mobility at the transport or higher layers typically either 1) split the connection into multiple segments, 2) modify a standard TCP implementation by adding new messages and states to the TCP state machine, or 3) trick the application into believing that the connection still exists while an attempt is made to re-establish the connection.

For example, MSOCKS (Mobile Sockets) uses a split-connection proxy for connection redirection. MSOCKS inserts a proxy in the communication path between the mobile node and its correspondent hosts and uses a TCP splice mechanism to break the connection into multiple segments and thus hide the mobility issues of the mobile node from the correspondent hosts. However, adding a communication path proxy might significantly degrade service.

Some techniques include introducing a library between the application and the socket API that preserves the illusion of a single, unbroken connection over successive connection instances. All these approaches require linking the application with their respective (specific) libraries. The illusion of an unbroken connection is obtained by tricking the application into believing that the transport session is still active, even though the transport session has closed. The intermediate library then attempts to re-establish the (new) transport connection and maps the new transport connection to the application using it. The implementation of, and operational difficulties involved with, such solutions include virtualizing mechanisms like I/O polling, asynchronous and non-blocking I/O processes, the need for timers and signal handlers, and the need for additional process control interfaces such as "wait", "kill", and "exec".

Another technique provides a mechanism to achieve end-to-end host mobility by modifying the transport layer protocol and end applications. The modification adds new states and semantics to the TCP finite state machine and defines new TCP options to negotiate the migration of the connection. Other techniques exist that involve either changing the TCP header, packet format, protocol semantics, or adding additional headers in the packets. However, the disadvantage of these techniques is that the end-user applications have to be aware of the new feature to make use of it, implying required changes to those existing applications.

SUMMARY OF THE INVENTION

In accordance with exemplary embodiments of the present invention, a seamless transport endpoint mobility (STEM) architecture migrates a transport connection endpoint from an old address to a new address without loss of the session. The migration process is negotiated between two endpoints themselves. Transport endpoint mobility includes communication between two STEM daemons, one STEM daemon in each endpoint, which dynamically update kernel data structures (e.g., elements of a 5-tuple associated with a TCP/IP application) associated with the session. Migration is transparent to the application using the underlying transport connection for data transfer.

In accordance with an exemplary embodiment of the present invention, a migrator migrates from a current endpoint address to a new endpoint address during a session between the migrator and a non-migrator in a packet-based communication system. The migrator migrates by (a) changing, in the migrator, the current endpoint address to the new endpoint address; (b) suspending transmission to the non-migrator of packets with the new endpoint address; (c) informing the non-migrator of the change to the new endpoint address; and (d) resuming transmission to the non-migrator of packets with the new endpoint address.

In accordance with another exemplary embodiment of the present invention, a non-migrator migrates from a current endpoint address to a new endpoint address during a session between the non-migrator and a migrator in a packet-based communication network. The non-migrator migrates by (a) receiving a control message indicating the migrator's change to the new endpoint address; (b) changing, in the non-migrator, the current endpoint address to the new endpoint address; (c) acknowledging, to the migrator, the non-migrator's change to the new endpoint address; and (d) exchanging, with the migrator, packets of the session with the new endpoint address.

BRIEF DESCRIPTION OF THE DRAWINGS

Other aspects, features, and advantages of the present invention will become more fully apparent from the following detailed description, the appended claims, and the accompanying drawings in which:

FIG. 5 shows an exemplary format of a STEM system control message common control header;

FIG. 6 shows an exemplary format of a STEM system control message extension header for authentication;

FIG. 7 shows an exemplary format of a STEM system control message extension header for migration; and FIG. 8 shows an exemplary format of a STEM system control message extension header for opaque data.

DETAILED DESCRIPTION

Figure 1:
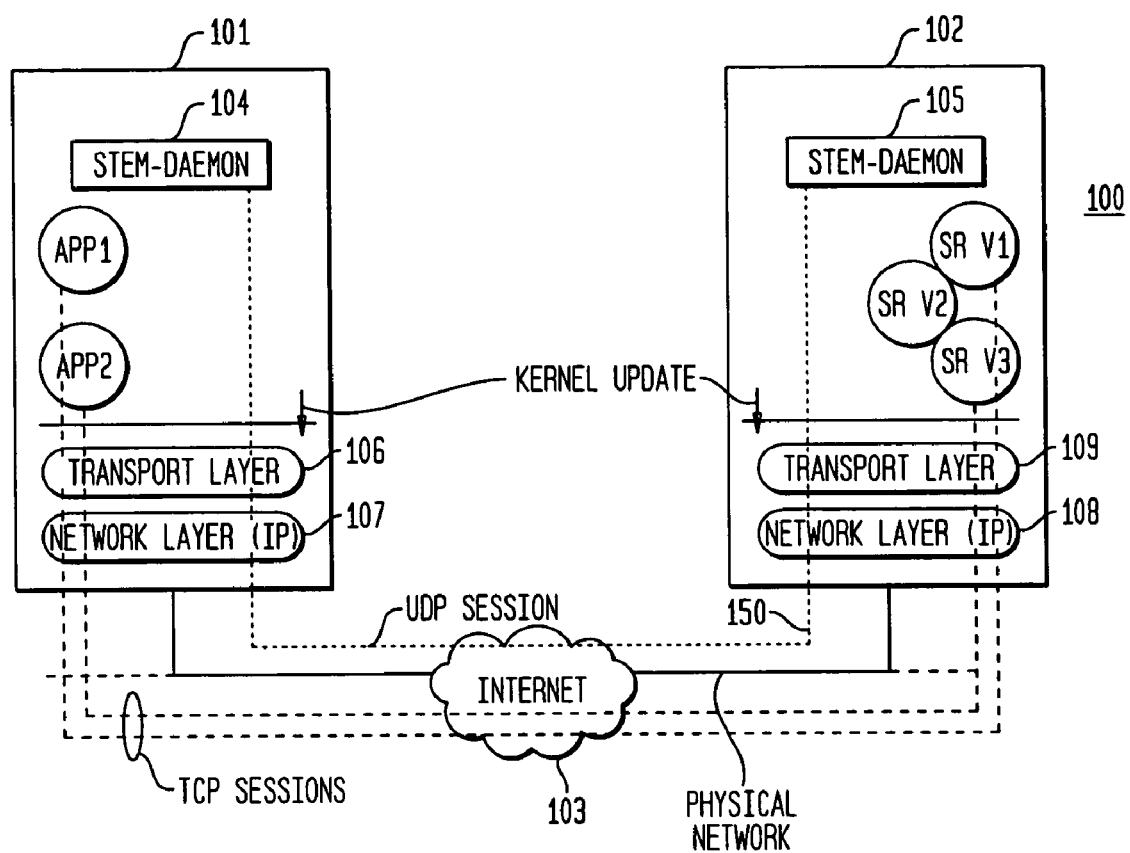
FIG. 1 shows a seamless transport endpoint mobility (STEM) architecture for two nodes communicating through a packet network.

The following terminology and definitions are employed as an aid to understanding the present invention. A "migrator" or "migrating endpoint" is an end system that is currently in the process of changing or has already changed its Internet protocol (IP) address. The migrator is the end system that initiates a control message to a remote endpoint identifying its new IP address. A "non-migrator" or "non-migrating endpoint" or "fixed endpoint" is the remote endpoint system that does not change its IP address. The non-migrator accepts the control message sent by the migrator and responds back to the migrator with acknowledgment messages. A one-to-one relationship between migrator/non-migrator and client/server does not necessarily exist. For the TCP connections, a client is a system that initiates a TCP connection to another system, while the server is that system which provides a service, such as file transport protocol (FTP), Telnet, or secure shell (SSH), to the client. The migrator/non-migrator might be either a client or a server.

The session establishment and maintenance process between the migrator and non-migrator conforms to the following characteristics. A node maintains existing communication with other nodes while changing its IP address or interface. All messages needed to migrate the connection to the new IP address might optionally be authenticated in order to provide protection against breaches in security of the session, such as various redirection and replay attack techniques. The node obtains an IP address through, for example, dynamic host configuration protocol (DHCP), manual configuration, or other available network mechanism. The IP address (or the point of attachment) does not change rapidly. The rate at which IP addresses might change, while still maintaining the corresponding transport-layer connection, depends on the speed with which the nodes can communicate with each other and update their kernel data structures after authentication. Both end systems of the connection preferably have relatively symmetric code implementing an embodiment of the present invention.

In accordance with exemplary embodiments of the present invention, a seamless transport endpoint mobility (STEM) architecture dynamically changes a 5-tuple association for an established session (connection) kept in the migrator's kernel data structure and informs the non-migrator to perform the same IP address modification to its kernel data structure. A dynamic, loadable kernel module and a control information communication daemon are employed in each of the endpoints to change the source and destination IP addresses in packets of both endpoints. Thus, to achieve a successful transport endpoint migration to a new IP address, references to the old IP address are desirably eliminated during data transfer. For the migrator, all IP packets transmitted to the non-migrator include the new IP address as the source address, while all packets received from the non-migrator include the new IP address as the destination address. From the non-migrator's perspective, all IP packets received from the migrator should contain the new IP address as the source address, while all packets transmitted to the migrator should contain the new IP address as the destination address.

FIG. 1 shows STEM system 100 for nodes 101 and 102 communicating through Internet 103. Node 101 comprises two user applications APP1 and APP2 generating data processed by transport-layer module 106 and network-layer module 107 prior to transmission as packets through Internet 103. Node 102 comprises network-layer module 108 and transport-layer module 109 to process packets received from Internet 103 to provide the data to applications servers SRV1, SRV2, and SRV3. Transport-layer modules 106 and 109 communicate based on, for example, transmission control protocol (TCP), and network-layer modules 107 and 108 communicate based on, for example, IP. TCP/IP communication is well known in the art and may be found in, for example, Andrew S. Tannenbaum, *Computer Networks*, second edition, Prentice Hall, 1988.

Application APP1 sets up and maintains a TCP/IP session with application server SRV1. STEM daemons 104 and 105 coordinate data exchange and control, such as identifying 5-tuple information including source and destination IP addresses, for nodes 101 and 102, respectively. STEM daemons 104 and 105 might be in communication through an out-of-band channel (channel separate from the TCP session channel), shown as a user datagram protocol (UDP) session passing through Internet 103.

Each STEM daemon is implemented with a dynamically loadable kernel module (not shown in FIG. 1). A daemon is a program that runs continuously and exists for the purpose of handling periodic service requests that a computer system expects to receive. The daemon program forwards the requests to other programs (or processes) as specified by a given communication protocol. The kernel modules of STEM daemons 104 and 105 modify their kernel data structures that store 5-tuple information. The 5-tuple uniquely identifies a kernel socket descriptor (descriptor identifying the TCP/IP session in the application).

Figure 2:
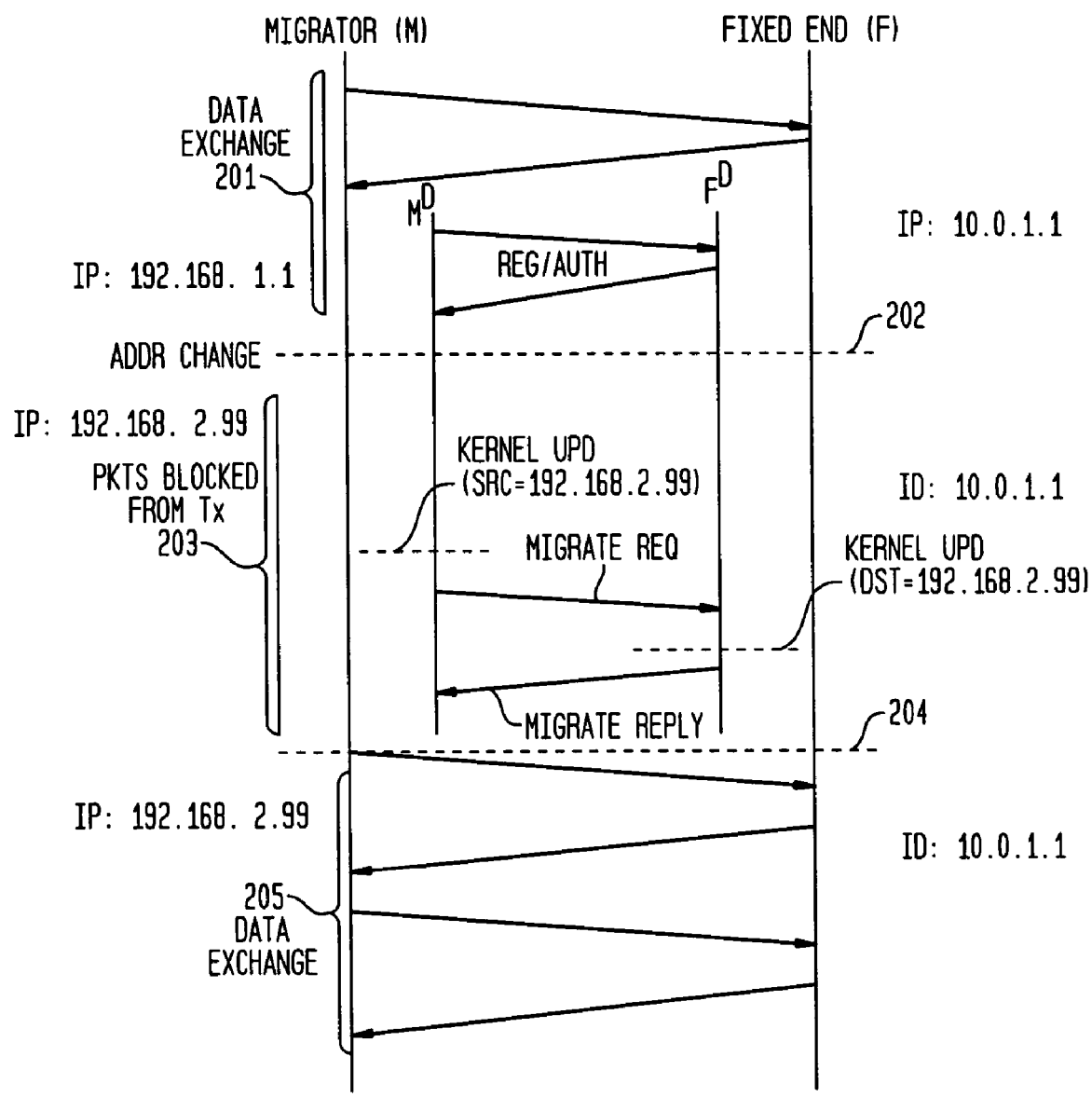
FIG. 2 shows an exemplary migration event sequence between a migrator and a non-migrator.

FIG. 2 shows an exemplary migration event sequence between a migrator and fixed end (the non-migrator). Normal data transfer takes place between the two endpoints during the period 201 using IP address 192.168.1.1 for the migrator. In FIG. 2, messages through the TCP session are shown under (M) for data from the migrator and (F) for data from the fixed end, while control messages through the out-of-band channel (e.g., UDP session) are shown under ($M^D$) for messages from the migrator and ($F^D$) for messages from the fixed end. At a point after the connection setup but before the IP address change point 202, the migrator optionally registers with the fixed end using a registration request for which the fixed end acknowledges with a reply through the out-of-band channel. The migrator optionally registers with the fixed end for security and to inform the fixed end that the migrator is about to move or change its IP address.

The migrator might obtain the new IP address for its interface with a number of different methods. The migrator may itself request the address from a higher level network manager or DHCP server, which will then assign and provide the address. Alternatively, the interface may be manually reconfigured to a new IP address.

At IP address change point 202, the migrator begins to change to IP address 192.168.2.99. During the period 203 after IP address change event 202, the kernel module of the migrator (e.g., node 101) updates the IP address in the 5-tuple data structure associated with the socket descriptor. Each socket descriptor is uniquely associated with a 5-tuple. The kernel data structure update begins by searching all open socket descriptors and matching them against the specified 5-tuple (containing the old IP address as one of the tuples). Once a valid match is identified, the appropriate change is made to this data structure to reflect the new IP (endpoint) address. In addition, packet transmission to the destination node is suspended. TCP data segments are buffered in the node's send queue (TCP send-Q) until a valid route is established.

Thus, as far as the application (e.g., APP1) is concerned, the changes to the kernel are transparent, since the application is still bound to the same socket descriptor. Thus, the application employs the same socket descriptor and continues to operate normally. Data sent on the modified socket descriptor yields a valid route/interface during the route lookup process. Concurrently, the migrator informs the remote- (fixed-) end of the change to the new endpoint IP address through out-of-band communication (shown as control message "migrate req"). Based on this information, the fixed end applies similar changes to its kernel data structures such that the destination address in the IP header of the data packets sent out by the fixed-end reflects the new value. The fixed end acknowledges the modification of its kernel (shown as control message "migrate reply") to the migrator, and the two end-points resume communication as a normal TCP session in period 205 using the new IP address for the migrator. TCP data segments buffered in the TCP send-Q are sent out of the interface towards the destination, since there is a valid route, and the IP address of all packets transmitted contain the appropriate new address in the IP header.

Controlling the migration process in a smooth and systematic manner prevents conditions, called race conditions, which may generate TCP reset messages that would terminate the connection. Specifically, preferred embodiments might prevent these conditions by ensuring 1) that the migrator's kernel changes are always applied first before the non-migrator is informed of these changes and 2) that the migrator does not send any data on that session during the control message exchange period. Such prevention might be achieved, for example, by using firewall rules on the system (e.g. output chain rules of iptables in a Linux operating system) to prevent any session data from leaving the system until the migration process is complete. The rules are dynamically added to the kernel to explicitly prevent transmission of packets on this session to the remote-end. Once an acknowledgement from the non-migrator is received, the rules are withdrawn to resume normal operation. Alternatively, preferred embodiments might delay the reassignment of the old endpoint IP address for a certain time period. This ensures that two different sessions do not concurrently employ the same IP address.

Figure 3:
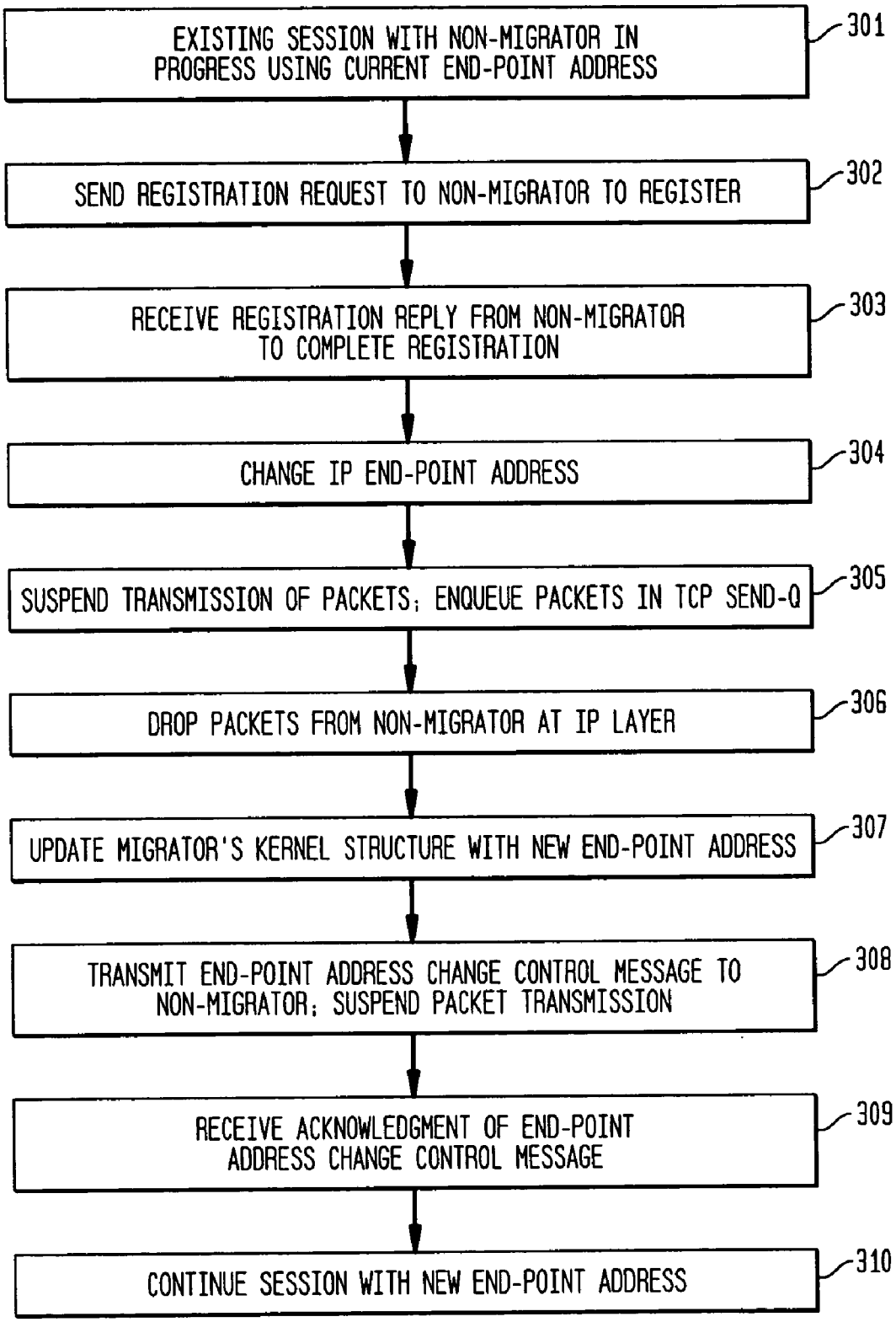
FIG. 3 shows an exemplary method employed by the migrator during the event sequence of FIG. 2.

FIG. 3 shows an exemplary method employed for the migrator during the event sequence of FIG. 2. At step 301, the migrator is currently participating in an existing session with the non-migrator using a current endpoint IP address. At step 302, the migrator sends a Registration Request control message to the non-migrator through an out-of-band channel (e.g., a UDP channel) to register the migrator with the non-migrator. At step 303, if step 302 is performed, the migrator receives a Registration Reply control message from the non-migrator through the out-of-band channel as an acknowledgment of registration by the non-migrator.

At step 304, the migrator begins to change its current endpoint IP address to a newly acquired endpoint IP address ("new endpoint IP address). At step 305, the migrator suspends transmission of packets, and enqueues the packets in the TCP send-Q. At step 306, the migrator begins dropping packets received from the non-migrator that contain the old endpoint IP address. At step 307, the migrator updates the migrator's kernel data structure of the STEM daemon to include the new endpoint IP address.

At step 308, the migrator sends an Endpoint Address Change control message to the non-migrator through the out-of-band channel to indicate that the migrator has changed to the new endpoint IP address. During this period, the migrator continues to enqueue packets in the TCP send-Q. At step 309, the migrator receives an Endpoint Address Change Acknowledgment control message from the non-migrator through the out-of-band channel indicating that the non-migrator has changed its kernel data structure to include the new endpoint IP address. At step 310, the migrator continues the session with the new endpoint IP address by releasing packets from the TCP send-Q.

Figure 4:
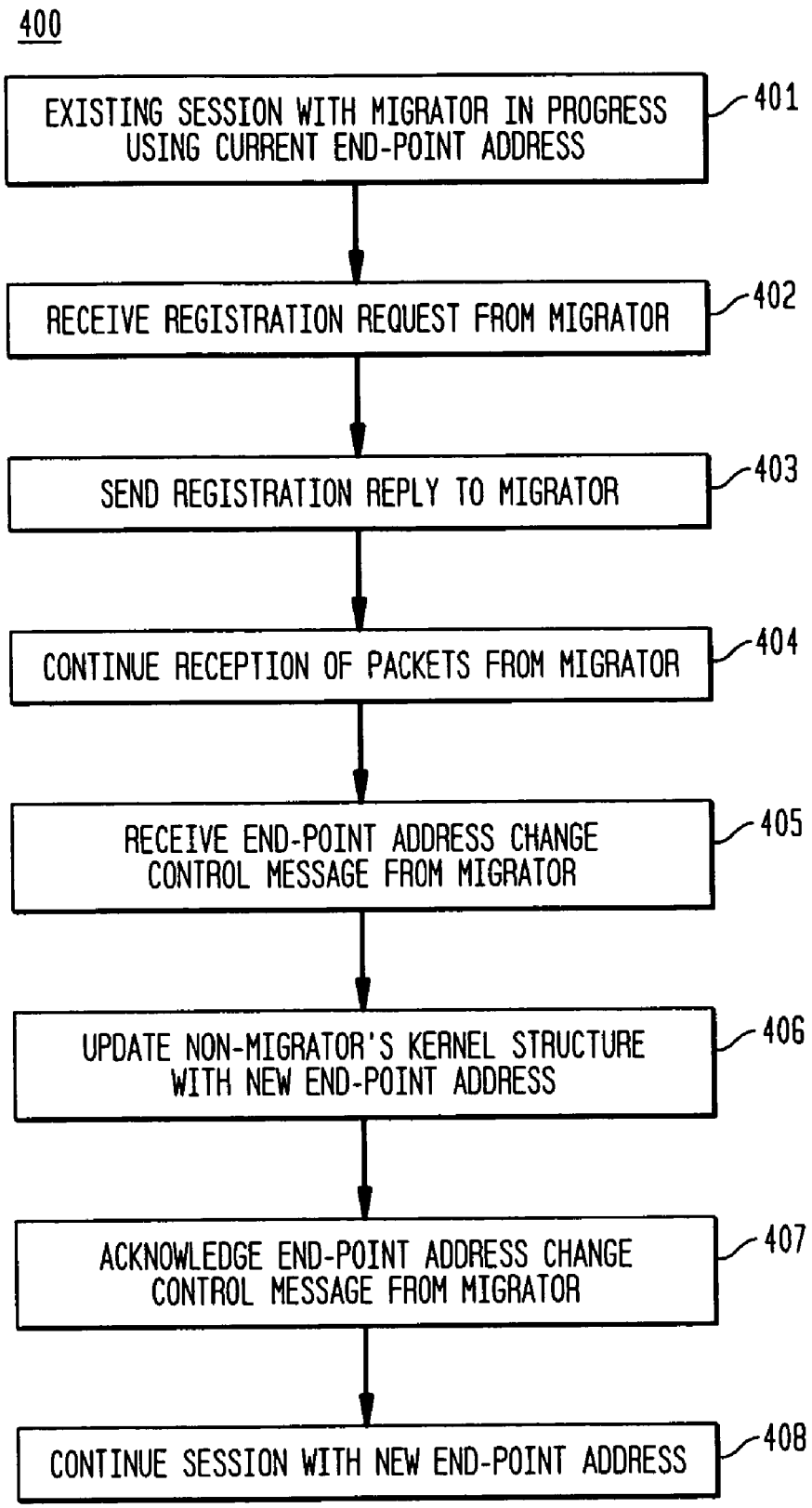
FIG. 4 shows an exemplary method employed by the non-migrator during the event sequence of FIG. 2.

FIG. 4 shows an exemplary method employed by the non-migrator during the event sequence of FIG. 2. At step 401, the non-migrator is currently participating in an existing session with the migrator using a current Endpoint IP address. At step 402, the non-migrator receives a registration request from the migrator through an out-of-band channel to register the migrator with the non-migrator. At step 403, if step 402 is performed, the non-migrator registers the migrator and sends a registration reply control message to the migrator through the out-of-band channel as an acknowledgment of registration by the non-migrator.

At step 404, the non-migrator continues reception of packets from the migrator that contain the old endpoint IP address. At step 405, the non-migrator receives an Endpoint Address Change control message from the migrator through the out-of-band channel to indicate that the migrator has changed to the new endpoint IP address. At step 406, the non-migrator updates the non-migrator's kernel data structure of the STEM daemon to include the new endpoint IP address.

At step 407, the non-migrator sends an Endpoint Address Change Acknowledgment control message to the migrator through the out-of-band channel indicating that the non-migrator has changed its kernel data structure to include the new endpoint IP address. At step 408, the non-migrator continues the session with the new Endpoint IP address.

Returning to FIG. 1, STEM system 100 employs an out-of-band control channel, shown as UDP channel 150, to communicate between peers such as STEM daemon modules 104 and 105. Out-of-band communication through UDP channel 150 provides the advantage that the migrator might communicate its changes to the non-migrator even after the IP address change occurs. In addition, out-of-band communication might carry information pertaining to multiple TCP sessions concurrently. FIGS. 5 through 8 show formats for exemplary control messages for the migrator and non-migrator that may be exchanged through UDP channel 150. A common header is used in all control messages, which might conform to a UDP format having non-zero checksum.

FIG. 5 shows an exemplary format of a STEM system control message common control header. In FIG. 5, "Version" identifies to the version number of the protocol, "Sequence #" identifies the 16-bit message count in the data message sequence, "Identifier cookie" is 48-bit identifier uniquely identifying a node, and "Replay Protect ID" is a 64-bit unique identifier based on a timestamp or a random value to protect against replay attacks. "Type" identifies the packet as a control message type and might take on four values: a "1" indicates the message is a registration request, a "2" indicates the message is a registration reply, a "3" indicates the message is a migration request, and a "4" indicates that the message is a migration reply. "Flags/Codes" identifies the flags and return codes used in the migration registration control message, where a "1" indicates the registration request is accepted. Other values of "Flags/Codes" may indicate that the registration request is denied for a given reason.

The registration process begins with the migrator sending a Registration Request control message indicating its capabilities to the non-migrator. After authentication and validation, the non-migrator responds with the Registration Reply control message with the appropriate reply code set which indicates the status of the request. The "identifier cookie" field is used to uniquely identify a node. Many methods by which this cookie can be generated are known in the art. For example, cookie generation methods used in SCTP or TCP (e.g., SYN cookie generation) may be employed. Typically, the cookie is a function of an invariant that identifies the node. For example, since the IP address is continuously changing, a fully qualified domain name with a one-way hash function applied to the domain name yields a unique 48-bit entry cookie.

The Replay Protection ID field, constructed by the migrator, is used for matching the registration requests and reply messages to thwart playback/replay attacks. A replay attack is an attack on a security protocol using replay of messages from a different context into the original context, thereby fooling the honest participant(s) into believing they have successfully completed the protocol run. The registration reply message from the non-migrator sets this field to a value computed based on the Replay Protection ID field received in the request message and the style of the replay protection mechanism used (e.g., timestamp or nonces (random values) given by the node's security association).

FIG. 6 shows an exemplary format of a STEM system control message extension header for authentication. In FIG. 6, "Type" identifies the packet as an authentication header type, "Length" is the length of the packet, "SPI" is a security parameter index that identifies a security context between two peers, and "Authentication" is a variable length authentication field.

The authentication mechanism employed by the exemplary STEM system might be similar to that used in Mobile IP. Each node supports a security association indexed by the opaque security parameter index (SPI) and the identifier cookie. The SPI within the authentication extension header defines the security context which is used to compute the authentication value and is used by a receiver to check that value. The receiver selects the authentication algorithm (e.g. cipher algorithms HMAC-MD5 (Hashed Message Authentication Code-Message Digest version 5) and SHA (Secure Hash Algorithm)), algorithm mode (e.g., prefix+suffix) and the secret (shared key or public/private key pair) used in computing the authentication based on this SPI. The authentication value computed protects the UDP channel packet's payload (Registration Request/Reply control messages), other extensions (Migrate Request/Reply control messages) and the initial part of the packet header (type, length, and the SPI).

FIG. 7 shows an exemplary format of a STEM system control message extension header for migration. In FIG. 7, "Type" identifies the packet as a migration header type, "Length" is the length of the data, "Proto Flags" indicates the protocol type (e.g., bit 0=TCP, bit 1=UDP), "Old IP addr" is the IP address before migration, "New IP addr" is the IP address after migration, "Old Port" is the old port number before migration, and "New Port" is the new port number after migration.

The migration process, as described above, involves exchanging migration request/reply control messages between the peers. In addition to the common header and the optional authentication header, the control message includes one or more migration headers. Each migration header contains information on mapping the old 5-tuple to a new 5-tuple, for one or many sessions between the peers. Each bit in the "protocol flags" field indicates a predefined protocol. More than one bit might be sent simultaneously to indicate migration of multiple protocols of interest. Setting the field to a null value indicates migration for all protocols. The "Old IP" and "New IP" fields provide the specified mapping from the old IP address to the new IP address of the migrating endpoint, while the "Old Port" and "New Port" fields provide the equivalent mappings for the ports used in each session. As in the "Protocol ID flags" field, the port fields might also be set to a null value to indicate that the migrator desires to migrate all sessions between the two endpoints, such as when the mobile node moves across IP subnets and the mobile node desires to migrate all open sessions simultaneously.

In addition to messages in the out-of-band channel described with respect to FIGS. 5, 6, and 7, additional out-of-band messages may be employed for specific applications of the STEM system. Since the STEM system may be employed for host mobility, messages for connection handoff and location management might be employed. Such messages may contain data such as location, fixed-endpoint, signal-to-noise ratio (SNR), connection quality, or similar information, collectively termed "opaque data". FIG. 8 shows an exemplary format of a STEM system control message extension header for opaque data. In FIG. 8, "Type" identifies the packet as an opaque header type, "Length" identifies the length of the "Sub-Type" and "Opaque Data" fields, "Sub-Type" indicates the type of update information included in the opaque data (e.g., location update information), "Flags/Codes" are flags or codes used to facilitate opaque data exchange, and "Opaque Data" is the variable-length opaque data of the packet.

The present invention may allow for the following advantages. Endpoints operating in accordance with one or more embodiments of the STEM system neither break the end-to-end TCP connection nor assign any code/proxy in the communication path between the endpoints. No new code is added in the data path, and the application is not tricked into believing that the connection still exists. One or more embodiments of the STEM system migrate the same TCP connection over to the new address or new point of attachment (i.e., the endpoint TCP state machine continues to be in an "ESTABLISHED" state during the migration process).

While the present invention has been described with respect to a packet network operating in accordance with a TCP-IP communication process, the present invention is not so limited. One skilled in the art may readily extend the teachings herein to other packet networks in which one node transfers it's connection to another node. In addition, the present invention may be preferred for use in wireless, radio, cellular or other non-wired applications (collectively termed "wireless" applications), but the present invention is not so limited and may be employed in wired or optical networks supporting packet-based communications.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of migrating from a current endpoint address to a new endpoint address by a migrator during a session between the migrator and a non-migrator in a packet-based communication system, the method comprising the steps of:
   (a) changing, in the migrator, the current endpoint address to the new endpoint address;
   (b) suspending transmission to the non-migrator of packets with the new endpoint address;
   (c) informing the non-migrator, via a channel separate from the channel of the session between the migrator and the non-migrator, of the change to the new endpoint address; and (d) resuming transmission to the non-migrator of packets with the new endpoint address, wherein the step of suspending transmission of packets to the non-migrator at the transport layer comprises preventing or resolving a race condition by applying one or more firewall-filtering rules to prevent session data from leaving the system until the migration process is complete.

2. The invention of claim 1, wherein step (a) comprises the steps of logically changing to the new endpoint address and updating a kernel structure of the migrator.

3. The invention of claim 2, wherein the migrator changes to the new current address by changing from a current 5-tuple comprising the current endpoint address to a new 5-tuple comprising the new endpoint address, and updating the kernel structure of the migrator comprises modifying a socket with the current 5-tuple to reflect the new 5-tuple, the socket being associated with the session.

4. The invention of claim 2, wherein step (a) comprises the steps of registering with the non-migrator before initiating the change to the new endpoint address.

5. The invention of claim 1, wherein step (b) comprises the steps of dropping packets from the non-migrator received at the network layer and suspending transmission of packets to the non-migrator at the transport layer.

6. The invention of claim 1, further comprising the step of dynamically adding and withdrawing the firewall-filtering rules for a given session during tuple update communication between the migrator and non-migrator.

7. The invention of claim 1, wherein step (c) comprises the steps of sending a control message to the non-migrator informing the non-migrator of the change to the new endpoint address and receiving a confirmation from the non-migrator that the non-migrator has changed to the new endpoint address.

8. The invention of claim 1, wherein, for steps (a) through (d), the session conforms to a transmission control protocol and an Internet protocol.

9. The invention of claim 1, wherein the method is implemented in a processor of a node in a packet network.

10. The invention of claim 9, wherein, for step (d), the session comprises packets exchanged between the migrator and non-migrator in at least one of a wired communication network and a wireless communication network.

11. A method of migrating from a current endpoint address to a new endpoint address by a non-migrator during a session between the non-migrator and a migrator in a packet-based communication network, the method comprising the steps of:
(a) receiving, via a channel separate from the channel of the session between the migrator and the non-migrator, a control message indicating the migrator's change to the new endpoint address;
(b) changing, in the non-migrator, the current endpoint address to the new endpoint address;
(c) acknowledging, to the migrator, the non-migrator's change to the new endpoint address; and
(d) exchanging, with the migrator, packets of the session with the new endpoint address, wherein transmission of packets with the new endpoint address to the non-migrator is suspended at the transport layer, the suspension comprising preventing or resolving a race condition by applying one or more firewall-filtering rules to prevent session data from leaving the system until the migration process is complete.

12. The invention of claim 11, wherein step (b) comprises the steps of logically changing to the new endpoint address and updating a kernel structure of the non-migrator.

13. The invention of claim 12, wherein the non-migrator changes to the new current address by changing from a current 5-tuple comprising the current endpoint address to a new 5-tuple comprising the new endpoint address, and updating the kernel structure of the non-migrator comprises modifying a socket with the current 5-tuple to reflect the new 5-tuple, the socket being associated with the session.

14. The invention of claim 12, wherein step (a) comprises the steps of registering the migrator before receiving the control message.

15. The invention of claim 11, wherein step (b) includes the step of continuing to receive packets from the migrator during the change.

16. The invention of claim 11, wherein, for step (d), the session conforms to a transmission control protocol and an Internet protocol.

17. The invention of claim 11, wherein the method is implemented in a processor of a node in a packet network.

18. The invention of claim 17, wherein, for step (d), the session comprises packets exchanged between the migrator and non-migrator in at least one of a wired communication network and wireless communication network.

19. A network comprising:
a migrator adapted to migrate from a current endpoint address to a new endpoint address during a session; and
a non-migrator adapted to migrate from a current endpoint address to a new endpoint address during a session,
wherein the migrator is adapted to:
(i) change, in the migrator, the current endpoint address to the new endpoint address,
(ii) suspend transmission to the non-migrator of packets with the new endpoint address,
(iii) inform the non-migrator, via a channel separate from the channel of the session between the migrator and the non-migrator, of the change to the new endpoint address, and
(iv) resume transmission to the non-migrator of packets with the new endpoint address, and
wherein the non-migrator is adapted to:
(i) receiving, via a channel separate from the channel of the session between the migrator and the non-migrator, a control message indicating the migrator's change to the new endpoint address,
(ii) change, in the non-migrator, the current endpoint address to the new endpoint address,
(iii) acknowledge, to the migrator, the non-migrator's change to the new endpoint address, and
(iv) exchange, with the migrator, packets of the session with the new endpoint address,
wherein the step of suspending transmission of packets to the non-migrator at the transport layer comprises preventing or resolving a race condition by applying one or more firewall-filtering rules to prevent session data from leaving the system until the migration process is complete.

20. A non-transitory computer-readable medium having stored thereon a plurality of instructions, the plurality of instructions including instructions which, when executed by a processor, cause the processor to implement a method for migrating from a current endpoint address to a new endpoint address by a migrator during a session between the migrator and a non-migrator in a packet-based communication system, the method comprising the steps of:
(a) changing, in the migrator, the current endpoint address to the new endpoint address;
(b) suspending transmission to the non-migrator of packets with the new endpoint address;

(c) informing the non-migrator, via a channel separate from the channel of the session between the migrator and the non-migrator, of the change to the new endpoint address; and
(d) resuming transmission to the non-migrator of packets with the new endpoint address,
wherein the step of suspending transmission of packets to the non-migrator at the transport layer comprises preventing or resolving a race condition by applying one or more firewall-filtering rules to prevent session data from leaving the system until the migration process is complete.

21. A non-transitory computer-readable medium having stored thereon a plurality of instructions, the plurality of instructions including instructions which, when executed by a processor, cause the processor to implement a method for migrating from a current endpoint address to a new endpoint address by a non-migrator during a session between the non-migrator and a migrator in a packet-based communication network, the method comprising the steps of:

(a) receiving, via a channel separate from the channel of the session between the migrator and the non-migrator, a control message indicating the migrator's change to the new endpoint address;
(b) changing, in the non-migrator, the current endpoint address to the new endpoint address;
(c) acknowledging, to the migrator, the non-migrator's change to the new endpoint address; and
(d) exchanging, with the migrator, packets of the session with the new endpoint address,
wherein transmission of packets with the new endpoint address to the non-migrator is suspended at the transport layer, the suspension comprising preventing or resolving a race condition by applying one or more firewall-filtering rules to prevent session data from leaving the system until the migration process is complete.

\* \* \* \* \*